United States Patent [19]
Emmanuel

[11] Patent Number: 5,836,119
[45] Date of Patent: Nov. 17, 1998

[54] WINDOW SASH

[75] Inventor: Brian A. Emmanuel, Merrill, Wis.

[73] Assignee: Lincoln Wood Products, Inc., Merrill, Wis.

[21] Appl. No.: 788,864

[22] Filed: Jan. 23, 1997

[51] Int. Cl.⁶ .................................................... E06B 3/988
[52] U.S. Cl. .................................... 52/204.71; 52/204.54; 52/656.5; 52/656.9; 52/717.01; 52/456
[58] Field of Search ............................ 52/204.53, 204.54, 52/204.71, 204.72, 314, 456, 656.5, 656.6, 656.9, 717.01, 717.02

[56] References Cited

U.S. PATENT DOCUMENTS

| | | |
|---|---|---|
| 2,910,740 | 11/1959 | Greenman . |
| 3,299,596 | 1/1967 | Neal et al. . |
| 3,566,542 | 3/1971 | Gillen et al. .......................... 52/656.5 X |
| 4,312,905 | 1/1982 | Kreusel ............................. 52/717.02 X |
| 4,495,726 | 1/1985 | Lindström . |
| 4,640,054 | 2/1987 | Breimeier et al. . |
| 4,644,721 | 2/1987 | Bloomquist et al. ...................... 52/456 |
| 4,702,055 | 10/1987 | Ralph ........................................... 52/456 |
| 4,720,951 | 1/1988 | Thorn et al. . |
| 4,741,127 | 5/1988 | Bockwinkel . |
| 4,831,804 | 5/1989 | Sayer ................................. 52/656.9 X |
| 4,982,530 | 1/1991 | Palmer . |
| 4,998,382 | 3/1991 | Kostos et al. . |
| 5,048,997 | 9/1991 | Peterson ............................. 52/656.5 X |
| 5,072,547 | 12/1991 | DiFazio . |
| 5,081,783 | 1/1992 | Mauro . |
| 5,274,976 | 1/1994 | Burkhart .................................. 52/456 |
| 5,379,518 | 1/1995 | Hopper ............................. 52/204.54 X |

FOREIGN PATENT DOCUMENTS

| | | |
|---|---|---|
| 2617 51 8 A1 | 11/1977 | Germany . |
| Nr. 386 089 | 4/1965 | Switzerland . |

OTHER PUBLICATIONS

"Wood Casemaster," Marvin Windows & Doors literature, p. 17.10, May 1994.
"Clad Casemaster," Marvin Windows & Doors literature, p. 2.9, May 1994.
"Casement," Weather Shield Windows & Doors literature, pp. 9.85, 9.55 and not numbered, Jan. 1994.
"Clad Wood Awning Windows," Hurd Wood Windows literature, p. CA3, Apr. 1994.
"Prime Wood Awning Windows," Hurd Wood Windows literature, p. CA3. Apr. 1994.
"Primed Casement Windows," Semco literature, p. CLA–3.
"Semclad Casement Windows," Semco literature, p. CCA–3.

Primary Examiner—Christopher Kent
Assistant Examiner—Timothy B. Kang
Attorney, Agent, or Firm—Lathrop & Clark

[57] ABSTRACT

The window sash of this invention employs strips of extruded plastic materials which are connected together by mechanical fasteners into an inner sash. The inner sash has barbed protrusions formed on the interior and the exterior which define interior and exterior channels into which wooden or metal trim members may be engaged in snap-fit relation. In operation, individual trim strips are first combined with interior sash elements. These sub-assemblies are then joined with L-shaped injection molded keys. The trim members, plastic keys, and plastic inner sash are then clamped in a frame and stapled together. The exterior sash trim or ring is assembled separately and brought together for assembly with the inner sash. A mastic adhesive is applied to the inner sash, a thermopane window light assembly is disposed on the adhesive, and a bead of adhesive is applied to the rabbet of the exterior ring which is then press-fit into engagement with the inner sash. The resultant product is interchangeable with a sash formed in a prior art method, while greatly reducing material costs and preserving thermal efficiency. Extruded aluminum muntins are connected to the exterior trim members by injection molded plastic connectors to form simulated divided lights.

22 Claims, 10 Drawing Sheets

WINDOW SASH

FIELD OF THE INVENTION

The present invention relates to windows for buildings in general and to windows having interior wood trim in particular.

BACKGROUND OF THE INVENTION

Advancements in material sciences and manufacturing techniques have seen the production of windows for commercial spaces and dwelling places from a wide variety of materials, including steel, aluminum and various plastics. Despite these developments natural wood is still the material of choice for interior window sashes and frames. The capacity of wood for holding paint or stain, its warmth to the touch, and its attractive appearance and favorable heat transfer properties support the continued desirability of wood as an interior window finish. Where decorative or aesthetic concerns dominate, wood may also be employed as an exterior window finish. Where weather conditions make wood exterior finishes a higher maintenance element, aluminum or other metals are often preferred as an exterior window finish.

Window sashes assembled from solid wooden members, however, require lengths of the highest quality lumber, typically in thicknesses of up to 2 inches (⅝ Timber). Conventional glazing methods have attached the window glass by fastening a narrow wooden exterior glazing bead over the glass which is set within a wooden sash. Another approach is to use vinyl or aluminum glazing strips which are connected directly to the wooden sash.

With increased attention to energy conservation and cost reduction in modern home construction, the energy efficiency of the dwelling's windows has become of key concern. To reduce heat transfer through the window sash, it is essential to avoid uninterrupted metallic heat paths which cross the thermopane window light. Thermopane assemblies which employ heat insulative barriers between the two panes of glass have performed admirably in minimizing conductive heat losses. This "warm-edge" technology is now employed extensively throughout the industry. However, with increased scarcity and cost of high quality lumber, attempts have been made to replace the exterior wooden finish of window sashes with aluminum extrusions. If these aluminum extrusions extend beyond the thermopane light, the benefits of the warm-edge light are lost.

Attempts have been made to develop window sashes having exterior and interior trim of disparate material. However, these products have suffered when it came to manufacturing techniques, requiring many mechanical fasteners which have made assembly time-consuming and costly.

What is needed is a window sash with a wooden interior which can economically be formed with a wood or metal exterior and which can be economically and repeatably assembled.

SUMMARY OF THE INVENTION

The window sash of this invention employs strips of extruded plastic materials which are connected together by mechanical fasteners into an inner sash. The inner sash has barbed protrusions formed on the interior and the exterior which define interior and exterior channels into which wooden or metal trim members may be engaged in snap-fit relation. In operation, individual trim strips are first combined with interior sash elements. These sub-assemblies are then joined with L-shaped injection molded keys. The trim, plastic key, and plastic inner sash are then clamped in a frame and stapled together. The exterior sash trim or ring is assembled separately and brought together for assembly with the inner sash. A mastic adhesive is applied to the inner sash, a thermopane window light assembly is disposed on the adhesive, and a layer of adhesive is applied to the rabbet of the exterior ring which is then snap-fit into engagement with the inner sash. The resultant product is interchangeable with a sash formed in a prior art method, while greatly reducing material costs and preserving thermal efficiency.

Extruded aluminum muntins are connected to the exterior trim members by injection molded plastic connectors to form simulated divided lights. The connectors have a series of depending teeth which are deformed in a friction fit as they are extended into the muntin bars. A two-segment bent tab extends from the connector which is deformed to snap fit into engagement with circular holes in the exterior trim strips of the sash.

It is an object of the present invention to provide a window sash having wooden interior surfaces and metal exterior surfaces.

It is another object of the present invention to provide a window sash having an interior surface formed of a first wood species and an exterior surface formed of a second, different wood species.

It is also an object of the present invention to provide a window sash assembly method which minimizes inducement of fractures in the window lights.

It is yet another object of the present invention to provide a method for assembling window sashes which minimizes labor.

It is a further object of the present invention to provide a window sash having simulated divided lights which is economically and securely assembled.

Further objects, features and advantages of the invention will be apparent from the following detailed description when taken in conjunction with the accompanying drawings.

DESCRIPTION OF THE PREFERRED EMBODIMENTS

Figure 1:
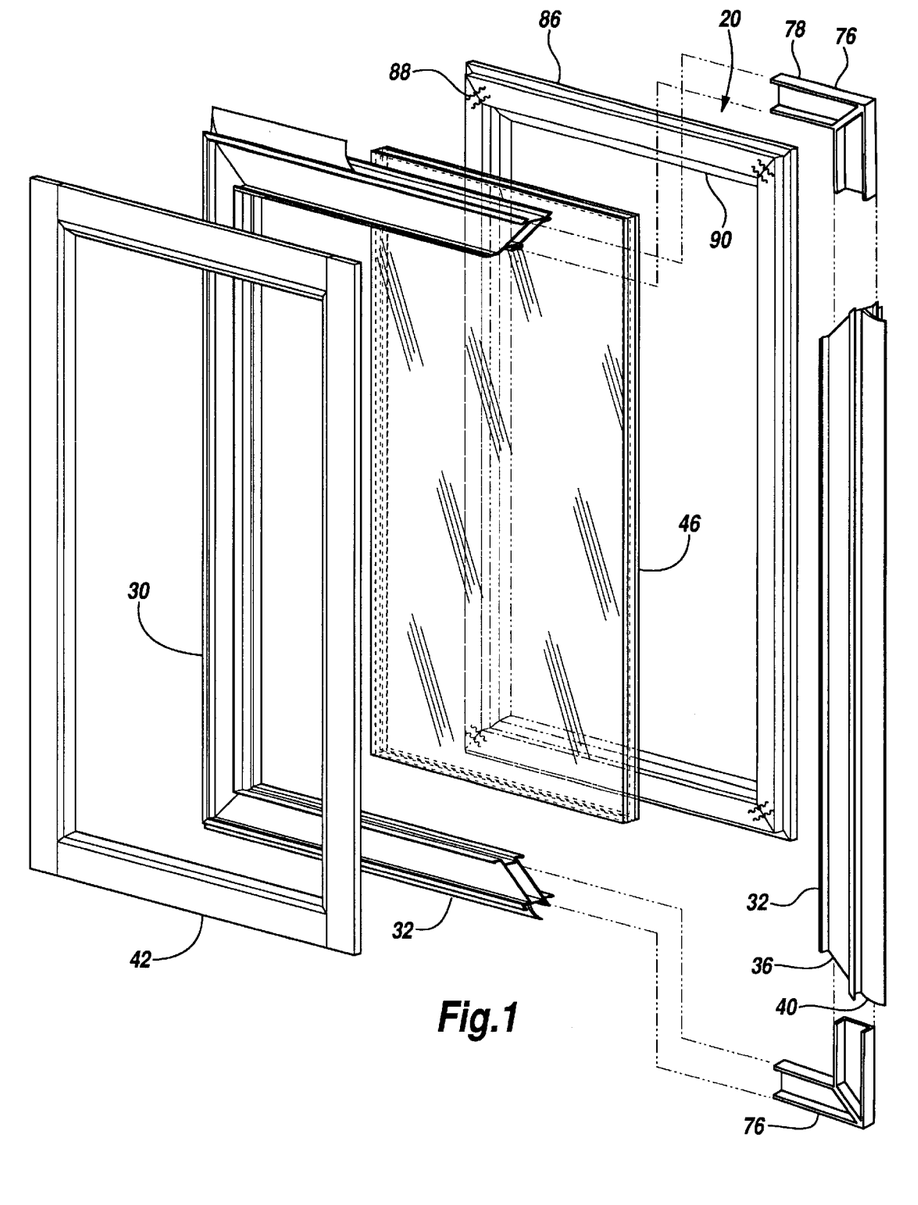
FIG. 1 is an exploded isometric view of a window sash of this invention.
Figure 2:
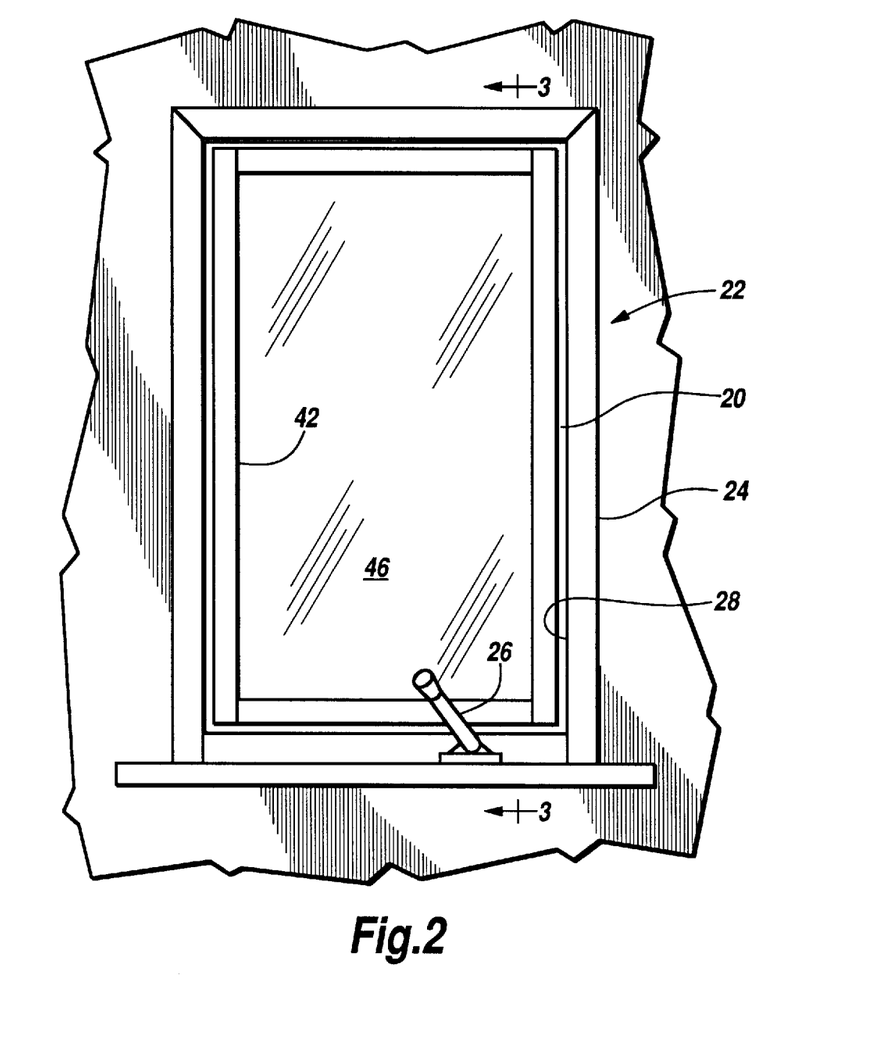
FIG. 2 is an interior elevational view of the window sash of FIG. 1 installed in a window frame mounted in a building wall.

Referring more particularly to FIGS. 1–18, wherein like numbers refer to similar parts, a sash 20 of the present invention is shown in FIG. 2 as part of a window assembly 22. The sash 20 is illustrated in the context of a casement window, which may be provided with an interior screen 31. It should be noted, however, that the sash 20 may also be employed in fixed windows, in hopper and awning windows and in other window applications.

The window assembly 22 includes a window frame 24 and window operator hardware 26 which engages the sash 20 for pivotal movement with respect to the window opening 28.

The sash 20 is an assembly of wooden, plastic and metal and glass parts which are fixed together in a secure engagement, which, at the same time, permits expansion and contraction and slight movements of the individual elements.

Figures 3, 4, 5, 6:
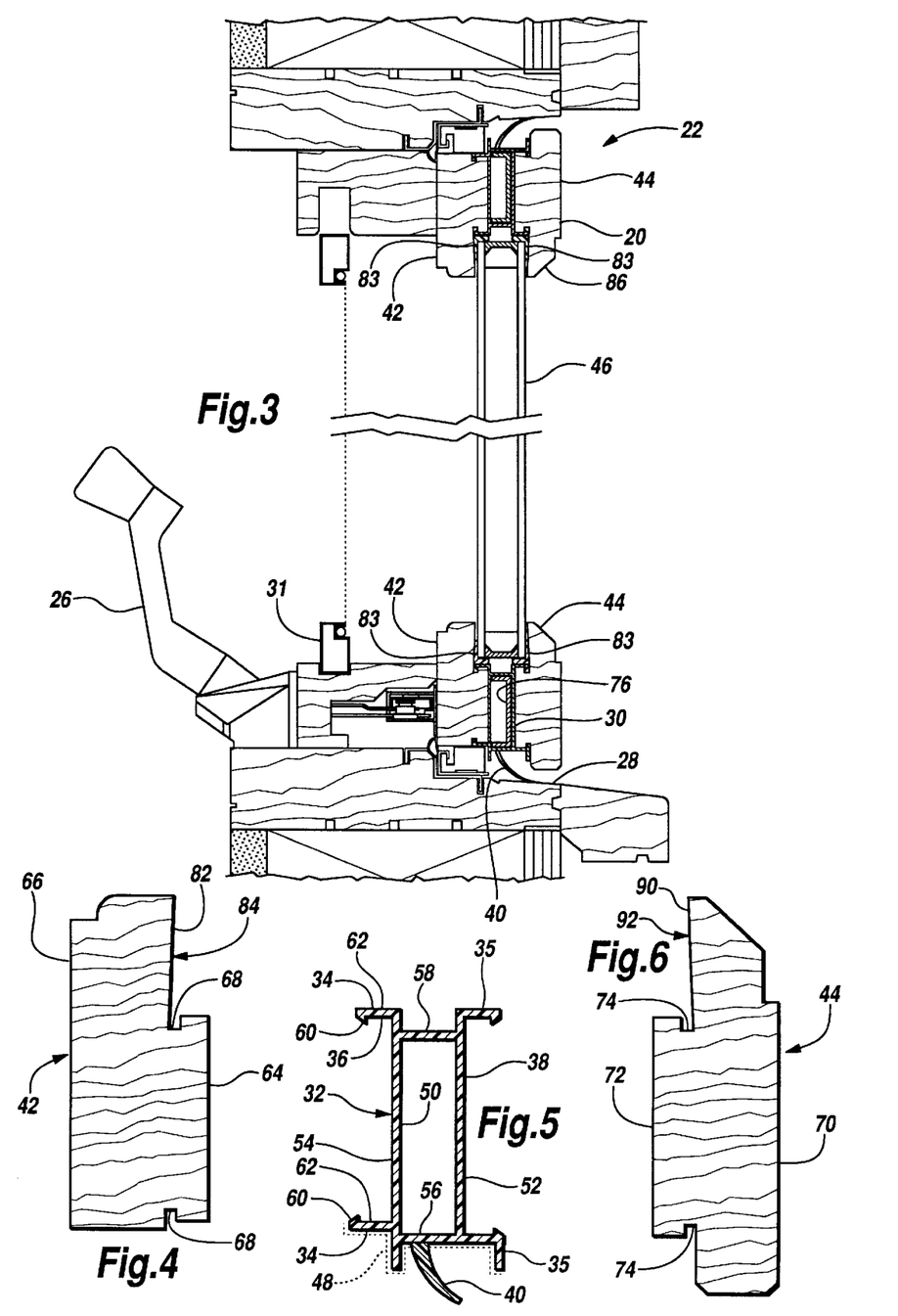
FIG. 3 is a cross-sectional view of the window sash and frame of FIG. 2 taken along section line 3—3.
FIG. 4 is an enlarged cross-sectional view of the interior trim member of the window sash of FIG. 3.
FIG. 5 is an enlarged cross-sectional view of the plastic inner sash member of the window sash of FIG. 3.
FIG. 6 is an enlarged cross-sectional view of the exterior trim member of the window sash of FIG. 3.
Figure 9:
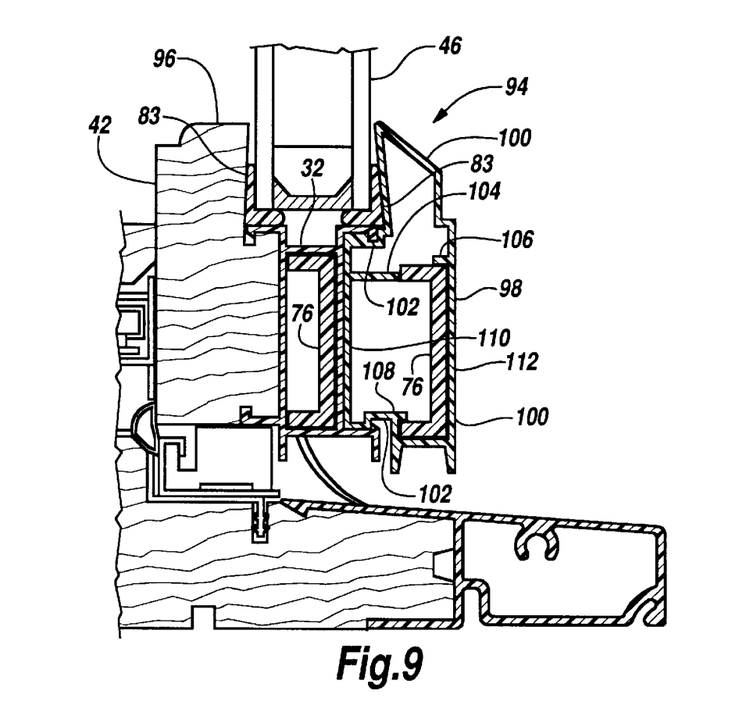
FIG. 9 is a fragmentary cross-sectional view of a window sash of this invention having an extruded aluminum exterior finish.
Figure 10:
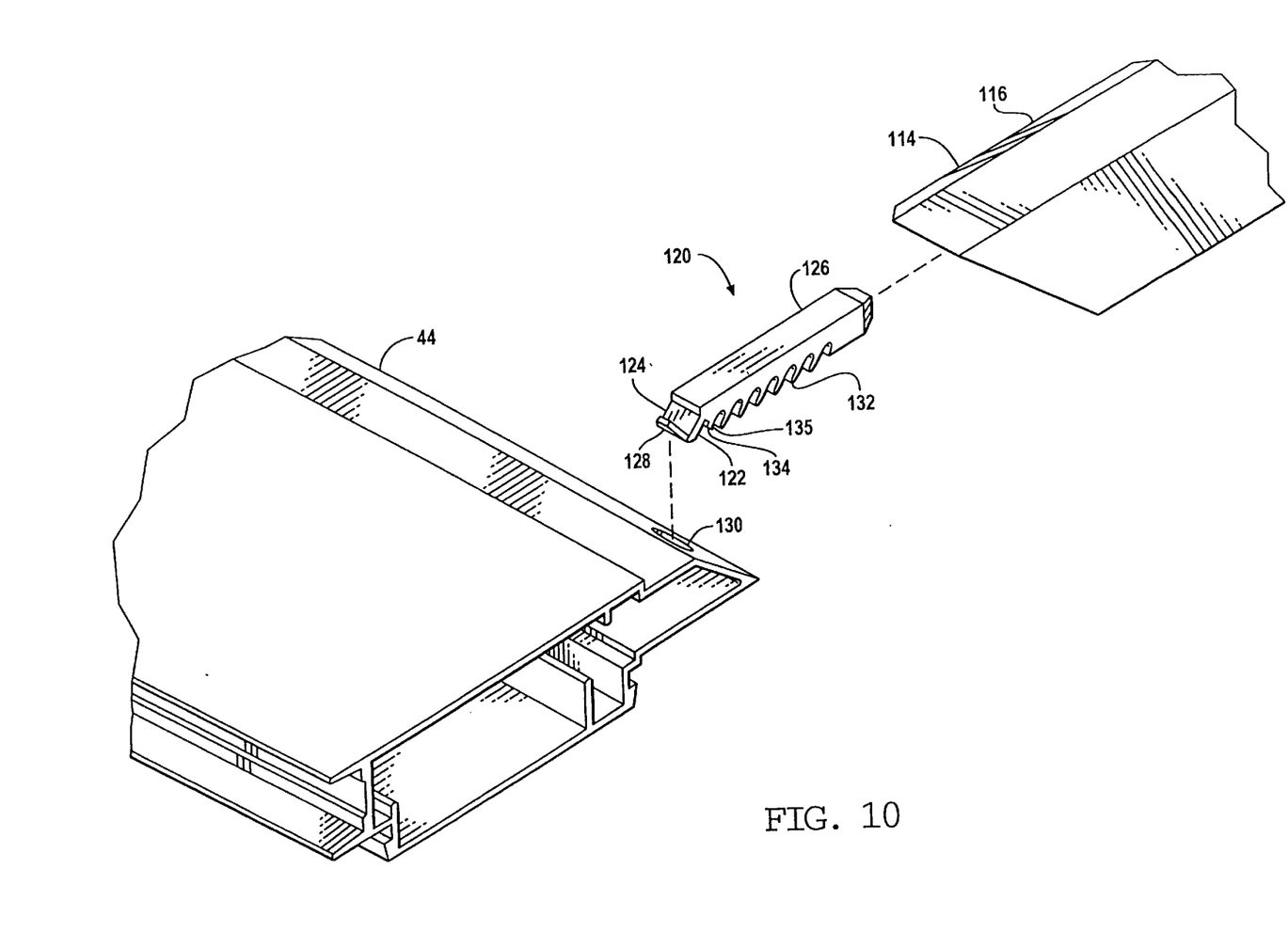
FIG. 10 is an fragmentary exploded top isometric view of a simulated divided light attachment for the window sash of this invention.
Figure 11:
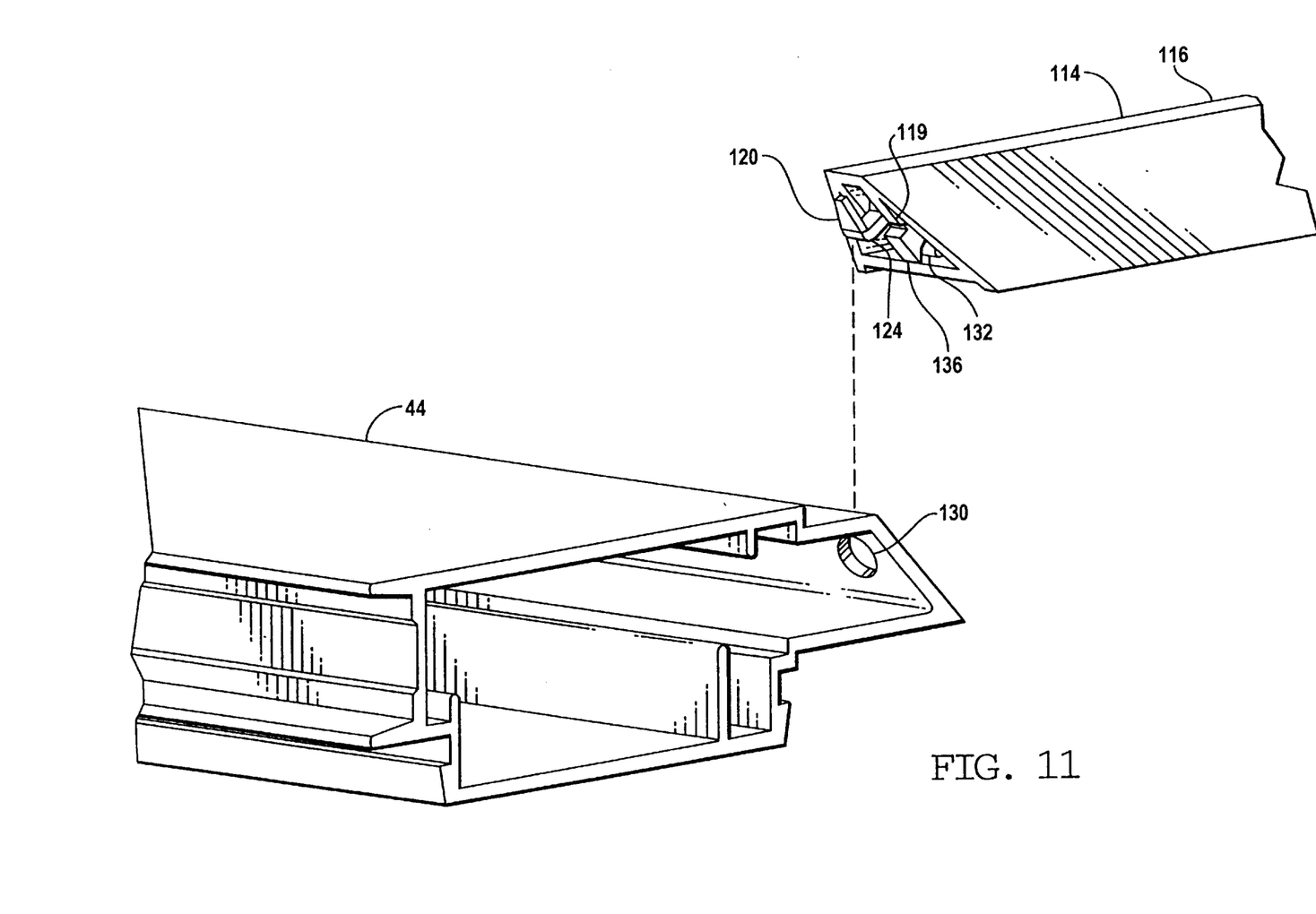
FIG. 11 is a fragmentary bottom isometric view of the simulated divided light attachment of FIG. 10.

The sash 20, as shown in FIG. 1, is comprised of a plastic inner sash 30, to which interior wood trim members 42 are fixed on the inside, and exterior trim members 44 are fixed on the outside. The exterior trim members 44 may be formed of wood, as shown in FIG. 3, or alternatively may be formed of extruded aluminum, as shown in FIG. 9 and described below. A thermopane glass assembly 46 is engaged between the exterior trim members 44 and the interior trim members 42, and provides good thermal insulation for the sash 20.

The inner sash 30 is comprised of four extruded inner sash members 32. As shown in FIG. 5, each inner sash member 32 is a tubular extrusion of plastic which is provided with a pair of spaced parallel barbs 34, 35 on each side, which define channels 36, 38, which engage with the interior and exterior trim strips. The inner sash members 32 are preferably extruded of an acrylonitrile-butadiene-styrene (ABS) copolymer. Suitable ABS copolymers are commercially available and include, e.g., CYCOLAC® ABS resins manufactured by General Electric Company. This material is notable for its stiffness, dimensional stability and resistance to the elevated temperatures to which window exteriors are subjected. The inner sash members 32 are co-extruded with a coating 48 of an acrylonitrile-styrene-acrylate (ASA) copolymer. Suitable ASA copolymers are commercially available and include, e.g., GELOY® ASA resins also manufactured by General Electric Company. CYCOLAC® plastic is subject to deterioration when exposed to ultraviolet rays, whereas GELOY® plastic exhibits good resistance to sunlight and is hence co-extruded along those portions of the strips which may be exposed to sunlight. The UV-resistant coating 48 is preferably formed along the sidewardly facing surface of the inner sash member 32 between and along an interior barb 34 and an exterior barb 35 and indicated in FIG. 5 by a broken line. A flexible weather strip 40 is also co-extruded of a more resilient plastic material to provide a seal between the sash 20 and the window frame 24 and extends from the coated portion of the inner sash member 32. Extrusions of this type can be manufactured by Clim-A-Tech of Hopkins, Minn.

As shown in FIG. 5, the inner sash members 32 are of constant cross section, and have a rectangular box-type center section 50 defined by an exterior wall 52 which is spaced generally parallel from an interior wall 54 by an outside wall 56 which faces toward the window frame 24, and an inside wall 58 which faces toward the glass assembly 46. The two interior barbs 34 extend toward the interior trim members 42. The interior barbs 34 are approximately 1.2 inches apart and terminate in generally inclined projections 60 which extend generally transverse to the barb arms 62. The plastic barb arms 62 are approximately 0.25 inches long, and hence are somewhat flexible about the interior wall 54 to which they are connected. The flexibility of the barb arms 62 allows an interior trim member 42 to be pressed into engagement with the inner sash member 32 and snapped in place.

As shown in FIG. 4, the interior trim member 42 has a protruding wooden tenon 64 which extends outwardly from the body 66 of the trim member. The tenon 64 joins the body 66 along two narrow kerfs 68. The tenon 64 is approximately the width of the interior channel 36, and is approximately as thick as the barb arms 62 are tall. Hence when the interior trim member 42 is pressed against the inner sash member 32 the projections 60 on the barb arms 62 engage with the kerfs 68 to hold the interior trim member against the inner sash member. The engagement between an individual interior trim member 42 and an inner sash member 32 is such that although the two parts cannot be separated by pulling apart, the parts can slide with respect to one another.

The exterior trim member 44, as shown in FIG. 6, has a body 70 with a tenon 72 which extends inwardly toward the inner sash 30. The tenon 72 extends from the body 70 along two kerfs 74. Hence when the exterior trim member 44 is pressed against the inner sash member 32, the barbs 35 engage with the kerfs 74 to hold the exterior trim member against the inner sash member.

Figures 7, 8:
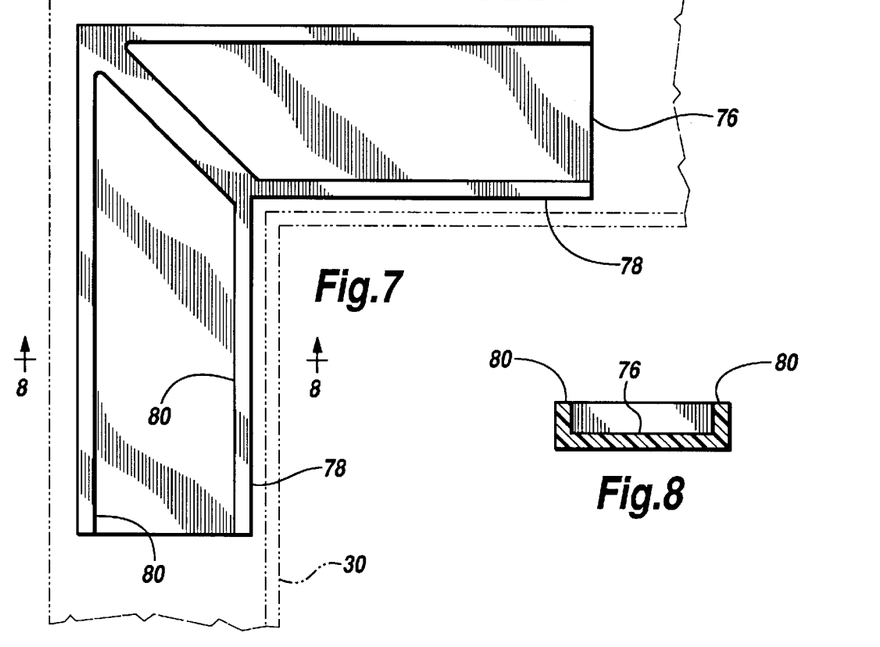
FIG. 7. is a side elevational view of the plastic key of the sash of FIG. 3.
FIG. 8 is a cross-sectional view of the plastic key of FIG. 7 taken along section line 8—8.

The assembly of the window sash 20 preferably proceeds as follows. Wooden interior trim members 42 and extruded plastic inner sash members 32 of corresponding lengths are first pressed together and stored as subassemblies. These parts may be joined by hand, but for consistency are preferably mated in a hydraulic press. Thus a plastic inner sash member 32 is set in the press, a wooden interior trim member is positioned over the inner sash member, and the press is activated to bring a flat press platen down to drive the two parts into engagement. Plastic L-shaped keys 76 are inserted into the ends of the interior trim member-inner sash member sub-assemblies which will form the stiles or the rails of the finished sash. Each key 76, as shown in FIGS. 7 and 8, is an injection molded part having two like arms 78. The arms have outer ridges 80 which stiffen the key 76 and give it an overall thickness which is approximately the same as the spacing between the exterior wall 52 and the interior wall 54 of the inner sash member 32. The width of the key 76 is approximately the same as the distance between the inside wall 58 and the outside wall 56 of the inner sash member 32. Hence the arms 78 engage in a press fit within the center section 50 of the inner sash member.

The interior trim member-inner sash member subassemblies may then be stored for assembly into sashes of various dimensions. An interior trim-inner sash subassembly is formed by connecting the interior trim member-inner sash member subassemblies in a press fit by engaging the protruding arms of the keys with the openings defined by the open ends of the inner sash member center sections 50. The assembled parts are preferably positioned within an automatic clamping apparatus, which ensures that the assembly is square. Three staple-type fasteners (not shown) approximately one inch long, are then driven through the connected inner sash members 32, the key 76, and the connected interior trim members 42. The fasteners may be about one inch long.

While held in a clamping apparatus, an acrylic mastic 83, for example Acrylthane mastic, manufactured by Schnee-Morehead, Inc. of Irving, Tex. is applied along a rabbet 82 located between the tenon 64 and the body 66 of the interior trim members 42. The rabbet 82 has a mastic receiving surface 84 which is inclined approximately three degrees from the plane of the thermopane glass assembly 46. The surface 84 slopes downward from a kerf 68 toward the glass assembly 46. The sloping surface 84 serves to direct the mastic toward the kerf 68—and not the surface of the glass assembly 46—when the glass assembly is disposed on the interior trim members. Although the mastic may be applied by hand, in a preferred embodiment it is dispensed automatically by a robotic assembly.

A pre-assembled thermopane glass assembly 46 is next positioned on the mastic on the interior trim members 42. The mastic thus not only provides an infiltration seal around the glass assembly 46, it also provides a resilient support of the glass, cushioning it from intimate contact with the wooden trim members. By suspending the glass in the mastic, the glass is protected from induced-stress cracks which could fracture the panes. Furthermore, the applied mastic has insulative effects and serves as a thermal break between the trim members and the thermopane assembly.

The exterior trim members 44 are assembled separately into an exterior trim sash 86, shown in FIG. 1. The exterior trim members have ends which are cut at 45 degrees, and are connected with corrugated metal fasteners 88. The material from which the exterior trim sash 86 is fashioned may be selected to suit the requirements of a particular sash. The exterior trim sash may be formed of primed wood, or wood with a vinyl covering, or of aluminum, as discussed more fully below. In addition, for costal applications, exterior trim sashes may be formed entirely of plastic. The wood exterior trim sash 86, has a rabbet 90, also having a mastic receiving surface 92 sloped at approximately three degrees, to which mastic is applied. The mastic-coated exterior trim sash 86 is then pressed together with the inner sash 30 in a roller press. The completed sash is now fully assembled, with the thermopane glass assembly cushioned between the exterior trim sash 86 and the interior trim members 42 on the applied mastic. The finished sash may now be assembled into a window assembly 22, or may be shipped for on-site assembly and installation.

Because of the wide variation in window opening size, tastes in window appearance, and architectural design requirements, window sashes are typically made to order. The sash 20 of this invention, because of its modular construction, with separate subassembly of the interior trim members and the exterior trim members, is well suited to a just-in-time assembly and delivery system. Careful assembly line control, coupled with computer-controlled clamps, can allow sashes which vary widely in size and materials to be assembled sequentially on a single assembly line.

It should be noted that, because the exterior trim members are not connected to the interior trim members by mechanical fasteners, but by their common connection in a snap-fit to the inner sash, the various wooden trim members are able to move to some degree with respect to the inner sash. This capacity for movement makes the sash less liable to fracture due to thermal changes.

A window assembly 94 with a sash 96 having an aluminum exterior trim sash 98 is shown in FIG. 9. The sash 96 is identical to the wood exterior trim sash 20, except for the provision of an exterior trim sash 98 which is composed of extruded aluminum exterior trim members 100. The outwardly facing profile of the aluminum trim members 100 may be similar to the profile of the wood exterior trim members 44. Two parallel grooves 102 are formed in the aluminum trim member which receive the exterior barbs 35 of the inner sash members 32 to achieve a snap fit between the inner sash 30 and the aluminum exterior sash 98. The aluminum exterior trim members 100 are connected with the same keys 76 which connect the inner sash members 32. The hollow exterior trim members 100 have three internal ribs 104, 106, 108 which support the arms 78 of the keys 76. A first rib 104 extends outwardly from the inner wall 110 of the trim member 100 to engage one of the key ridges 80 against the outer wall 112 of the trim member 100. A second rib 106 extends inwardly from the outer wall 112 to engage the width of the key arm 78 against the outside wall 112 of the trim member 100. A third rib 108 extends outwardly from a position adjacent a groove 102 to further constrain the key arm 78. The assembled aluminum exterior trim members 100 are held together by staking through the outside walls 112 of the trim members into the arms 78 of the keys 76. Mastic is then applied to the assembled exterior trim sash and it is pressed together with the glass assembly, inner sash, and interior trim members as discussed above.

The window sashes of this invention are amenable to lowered cost production because of the reduced labor required to assemble them, because lower-cost thinner wood is required then in solid wood sashes, and because the modular elements promote speedier assembly. In addition, a great variety of window sashes can be economically produced. Sashes with the appearance of divided lights may be produced by applying simulated muntins with double-sided adhesive tape to the glass in a conventional fashion. However, in a preferred embodiment, simulated divided lights are formed by the attachment of extruded aluminum muntins 114 to the exterior trim members 44, as shown in FIGS. 10–18.

Figure 18:
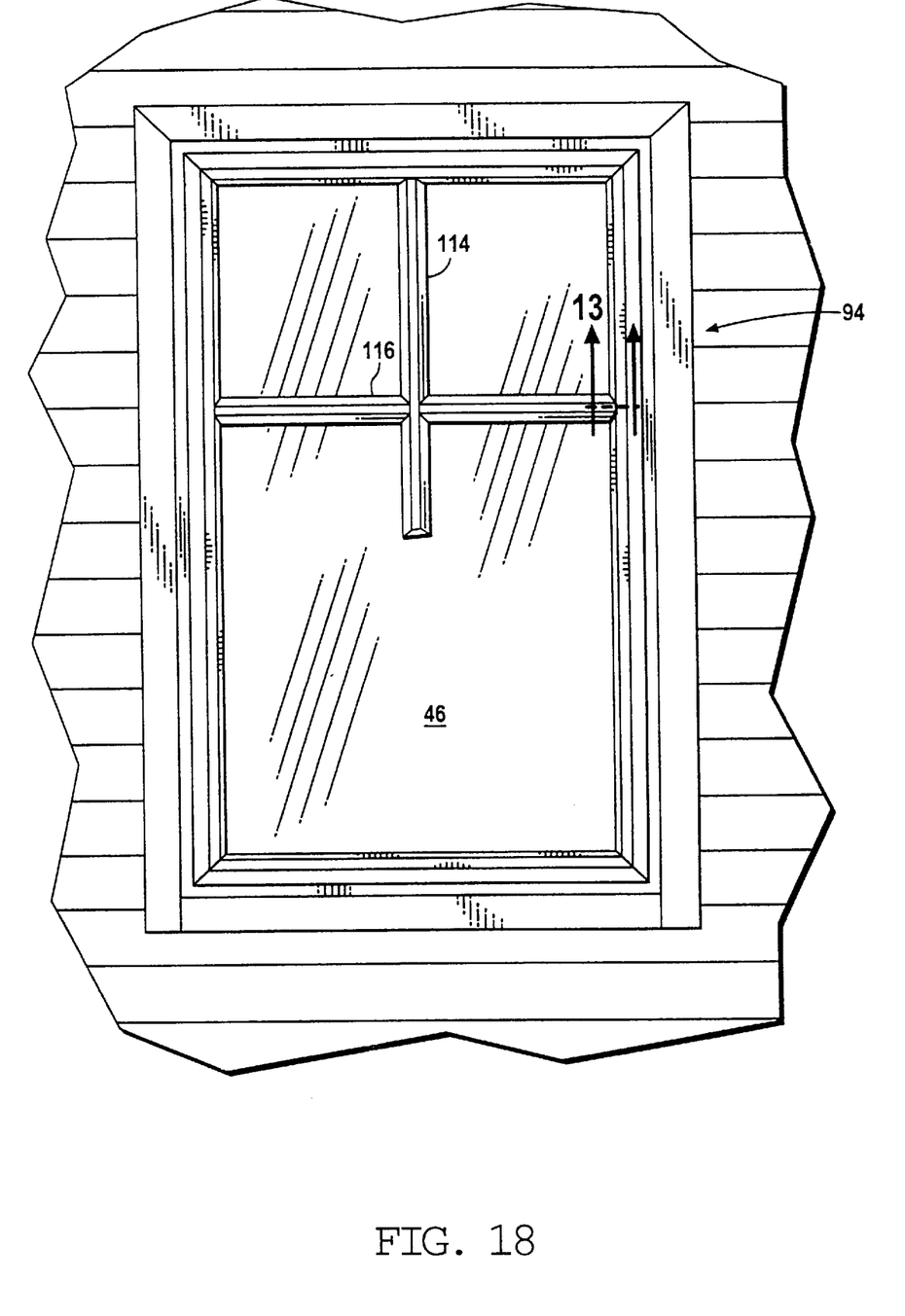
FIG. 18 is an exterior elevational view of the sash of this invention installed in a window frame mounted in a building wall, with the simulated divided light muntin assembly of this invention installed, and partially broken away in section.

A muntin assembly 116 comprised of one or more vertical muntins 114 and one or more horizontal muntins is snapped in place over the window glass assembly 46 on the exterior face of the glass as shown in FIG. 18. The grid of rectangular spaces defined by the muntin assembly 116 presents a simulation of multiple glass panes on the single large thermopane glass assembly 46. Simulated divided lights may be called for when matching new thermopane window sashes to older construction windows, or simply when it is desired to mimic a historic sash construction style.

Figure 17:
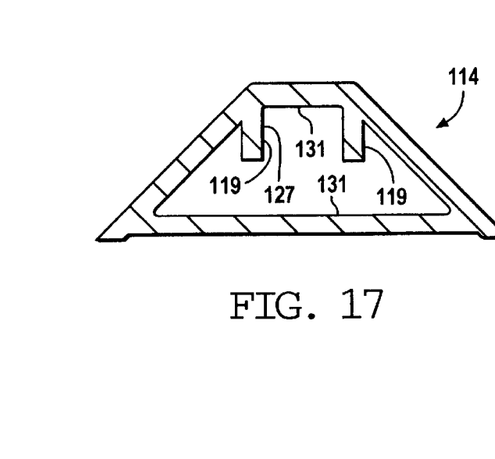
FIG. 17 is a cross-sectional view of the muntin of FIG. 13.

As shown in FIG. 17 each muntin 114 is a hollow aluminum tube. Flanges 119 are preferably extruded to extend the length of the muntins 114 which serve to center inserted injection molded polypropylene plastic connectors 120. Each connector 120 is inserted into each end of the muntin such that a bent tab 122 protrudes. The connectors have a body 126 which is approximately one inch long, and approximately two tenths of an inch thick. The tab 122 consists of two segments: a first segment 124 which extends downwardly and outwardly from the connector body 126, and a second segment 128 which extends upwardly and outwardly from the first segment 124 at an angle of about 67 degrees to the first segment.

Figure 14:
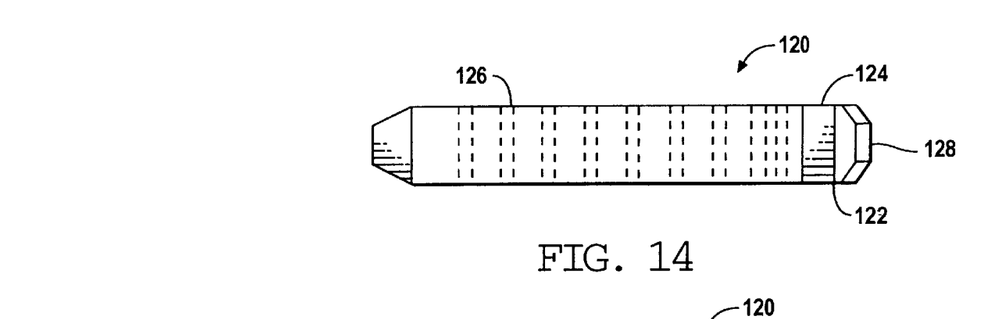
FIG. 14 is a front plan view of the muntin connector of FIG. 12.
Figure 15:
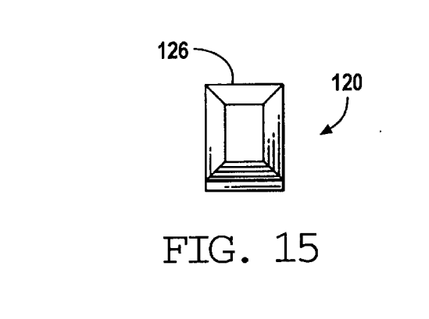
FIG. 15 is an end view of the muntin connector of FIG. 14.
Figure 16:
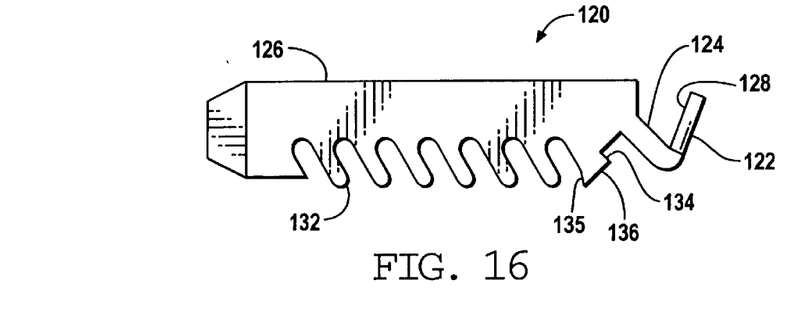
FIG. 16 is a side elevational view of the muntin connector of FIG. 14.

Circular holes 130 are drilled in the aluminum exterior trim members 100 corresponding to the location of each connector 120. As shown in FIGS. 14–16, the connector 120 is formed with a series of parallel rounded-end teeth 132 which extend downwardly from the connector body 126. The distance from the top of the connector body 126 to the bottom of the teeth 132 is slightly greater than the height of the interior channel 127. Hence, when the connector 120 is inserted into a muntin 114, each tooth 132 is flexed and engages with the muntin bar bottom wall 131, such that the connector is held in a friction fit with the muntin. Hence, while the connectors 120 are easily inserted into the muntins, they are not easily withdrawn. The final tooth 134 has a vertical surface 135 which engages against the inlet of the muntin bar 114 and prevents over-insertion of the connector into the muntin 114. Once connectors 120 have been positioned in each muntin end so that the bent tabs 122 protrude, the entire muntin assembly 116 is pressed into engagement with the sash 96.

Figure 12:
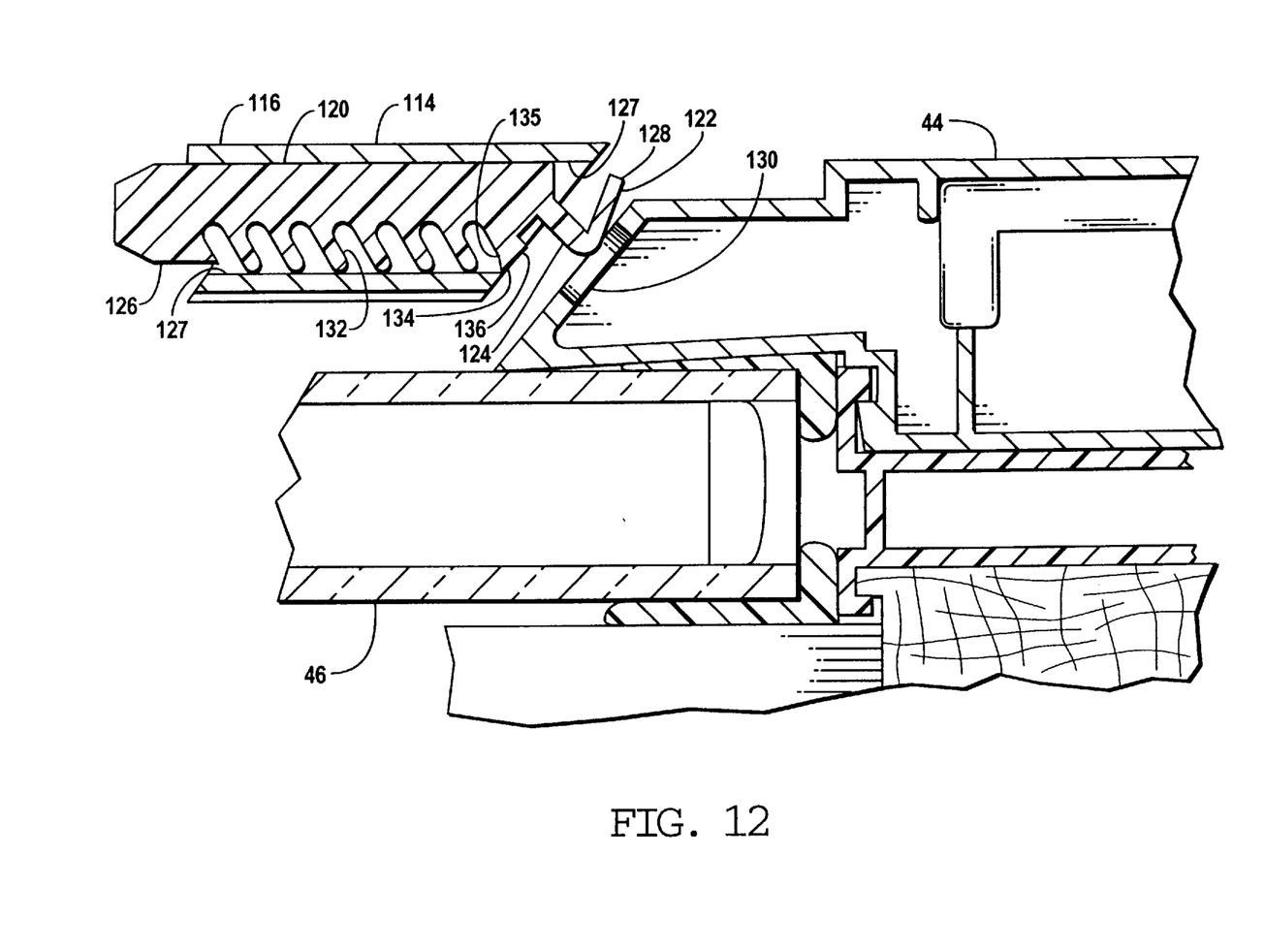
FIG. 12 is an exploded cross-sectional view of a simulated divided light muntin assembly in relation to the sash of this invention.
Figure 13:
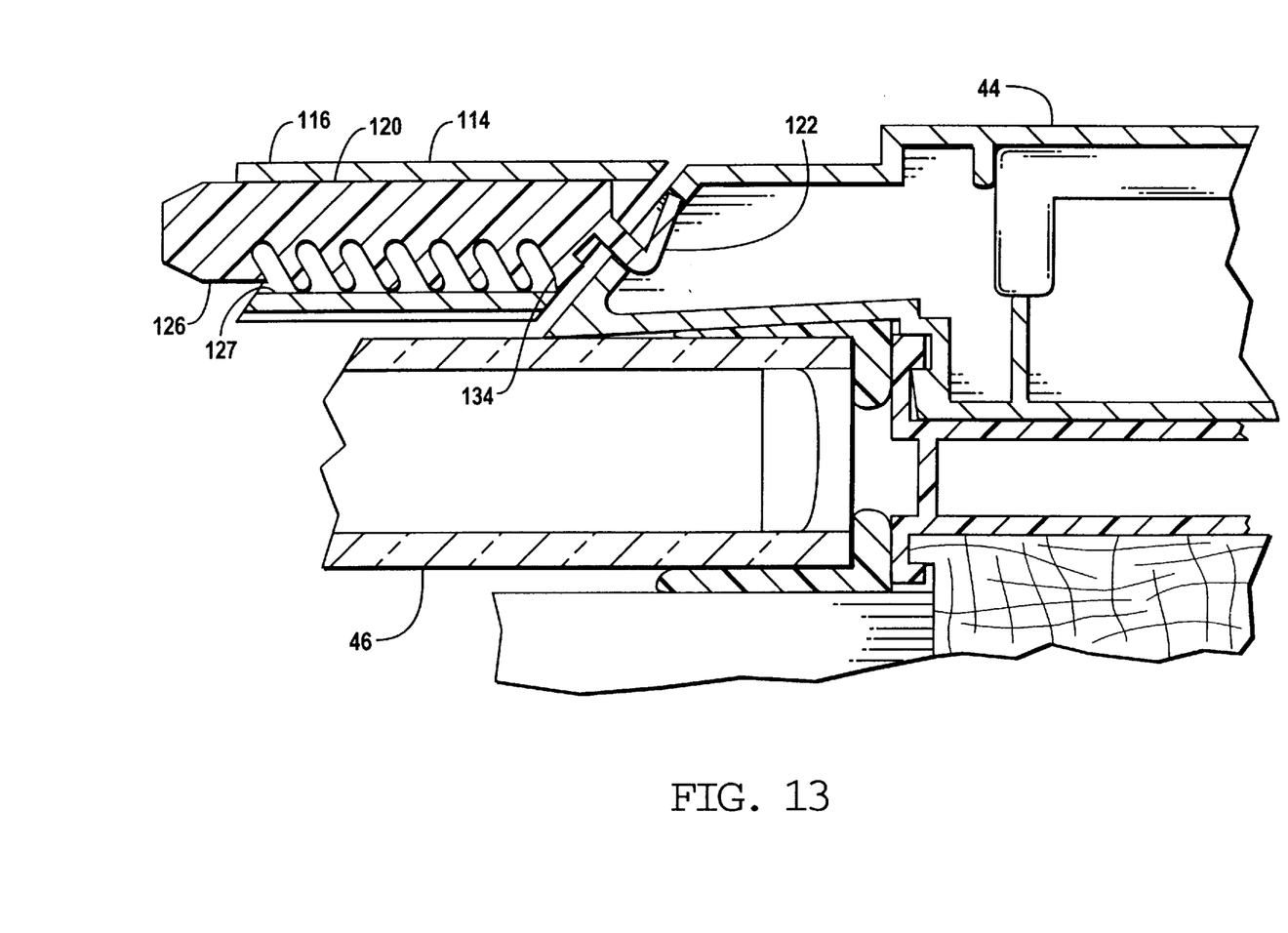
FIG. 13 is a cross-sectional view of the assembled sash and simulated divided light muntin assembly of FIG. 12.

As shown in FIG. 12, when the bent tabs 122 engage the walls defining the circular holes 130, the second tab segments 128 are deflected to fit into the holes. As shown in FIG. 13, once engaged within the holes 130, the tabs 122 resist removal of the muntin assembly 116 from the surface 136 final tooth 134 has an inclined surface 136 which lies along the surface of the exterior trim member 100.

It should be noted that the muntins, interior trim members, and exterior trim members may be formed to a variety of outwardly facing profiles to suit various desired decorative or ornamental styles or fashions.

It is understood that the invention is not limited to the particular construction and arrangement of parts herein illustrated and described, but embraces such modified forms thereof as come within the scope of the following claims.

I claim:

1. A window sash comprising:

four inner sash members connected to form a rectangular inner sash and defining an inside glass opening, wherein each inner sash member is a plastic extrusion and each inner sash member has a rectangular box-type center section defined by an exterior wall which is spaced generally parallel from an interior wall by an outside wall which faces away from the glass opening, and an inside wall which faces toward the glass opening, and two interior barbs extend from each sash member interior wall to define an interior channel, and two exterior barbs extend from each sash member exterior wall to define an exterior channel;

interior trim strips each having a first surface which extends substantially adjacent to the interior wall of the inner sash member, each interior trim strip being connected in a positive fit in one of said interior channels;

exterior trim strips each having a first surface which extends substantially adjacent to the exterior wall of the inner sash member, each exterior trim strip being connected in a positive fit in one of said exterior channels; and at least one glass pane positioned between the interior trim strips and the exterior trim strips.

2. The window sash of claim 1 wherein the barbs have barb arms which extend generally perpendicular to the interior walls and the exterior walls respectively from which they extend, and the barb arms terminate in generally inclined projections which extend generally transverse to the barb arms, the barb arms being flexible about the wall to which they are connected, wherein the flexible barb arms allow trim members to be pressed into engagement with the sash members and snapped in place.

3. The window sash of claim 1 wherein each interior trim member has a body with a portion which protrudes into an interior channel between the parallel interior barbs of an inner sash member.

4. The window sash of claim 3 wherein parallel grooves are defined by the protruding portion of each interior trim member, and the inner sash member interior barbs are received within the grooves.

5. The window sash of claim 3 wherein an inclined surface is defined on the body of the each interior trim member facing the glass pane, and wherein a bead of mastic is disposed on the inclined surfaces of the interior trim members to support the glass pane and form a seal therewith.

6. The window sash of claim 1 wherein the interior trim members and the exterior trim members have a body with a portion which protrudes into the inner sash member interior and exterior channels respectively, and wherein the body portions define inclined surfaces facing the glass pane, and mastic is disposed on the trim member body inclined surfaces to support and form a seal with the glass pane.

7. The window sash of claim 1 wherein the exterior trim members are formed of wood.

8. The window sash of claim 1 wherein the exterior trim members are formed of extruded aluminum.

9. The window sash of claim 8 wherein each exterior trim member has internal ribs which define an opening into which the arms of L-shaped keys extend to connect the exterior trim members.

10. The window sash of claim 8 wherein at least two opposed exterior trim members have portions defining holes therein, and further comprising:

at least one muntin bar extending between the holes in the two opposed exterior trim members, the muntin bar having two ends, one end opening adjacent to each of said trim member holes;

a plastic connector engaged in a press fit in each muntin bar end; and portions of each connector extending into one of said exterior trim member holes, thereby fixing the muntin bar to the window sash.

11. A window sash comprising:

two upright inner sash members which are parallel and spaced from one another, and two horizontal inner sash members which are parallel and spaced from one another and which extend between the two upright inner sash members to define a window light opening, wherein each inner sash member has spaced parallel exterior barbs defining an exterior channel facing a sash exterior and spaced parallel interior barbs defining an interior channel facing a sash interior, and wherein each sash member is extruded plastic having a rectangular center section which is open at the ends;

four L-shaped keys each having two perpendicular arms, wherein one arm of each key extends into a center section of a horizontal inner sash member, and the other arm of said key extends into an upright inner sash member, the horizontal inner sash members being thereby connected to and positioned with respect to the upright inner sash members, and wherein each key has a first thickness defined in the direction extending from the sash interior to the sash exterior, and wherein each arm has a width in the plane of the inner sash member to which it is connected which is greater than the first thickness;

two vertical interior trim members, each engaged in snap-fit relation with one of the upright inner sash members in an interior channel;

two horizontal interior trim members, each engaged in snap-fit relation with one of the horizontal inner sash members in an interior channel;

exterior trim members engaged in snap-fit relation in the exterior channels; and at least one glass pane positioned between the interior trim members and the exterior trim members.

12. The window sash of claim 11 wherein each interior trim member has a body with a portion which protrudes into an interior channel between the parallel interior barbs of an inner sash member.

13. The window sash of claim 12 wherein parallel kerfs are defined by the protruding portion of each interior trim member, and the inner sash member interior barbs are received within the kerfs.

14. The window sash of claim 12 wherein an inclined surface is defined on the body of each interior trim member facing the glass pane, and wherein a bead of mastic is disposed on the inclined surfaces of the interior trim members to support the glass pane and form a seal therewith.

15. The window sash of claim 11 wherein the interior trim members and the exterior trim member have a body with a portion which protrudes into the inner sash member interior and exterior channels respectively, and wherein the body portions define inclined surfaces facing the glass pane, and mastic is disposed on the trim member body inclined surfaces to support and form a seal with the glass pane.

16. The window sash of claim 11 wherein the exterior trim members are formed of wood.

17. The window sash of claim 11 wherein the exterior trim members are formed of extruded aluminum.

18. The window sash of claim 17 wherein each exterior trim member has internal ribs which define an opening into which the arms of L-shaped keys extend to connect the exterior trim members.

19. The window sash of claim 11 wherein at least two opposed exterior trim members have portions defining holes therein, and further comprising:

at least one muntin bar extending between the holes in the two opposed exterior trim members, the muntin bar having two ends, one end opening adjacent to each of said trim member holes;

a plastic connector engaged in a press fit in each muntin bar end; and portions of each connector extending into one of said exterior trim member holes, thereby fixing the muntin bar to the window sash.

20. A window sash comprising:

a rectangular inner sash comprised of four connected extruded plastic inner sash members which define an inside glass opening, each inner sash member having a center section defined by an exterior wall which is spaced generally parallel from an interior wall by an outside wall which faces away from the glass opening, and an inside wall which faces toward the glass opening, and wherein an interior channel is defined on the interior walls of the sash members, and an exterior channel is defined on the exterior walls of the sash members, each channel having two opposed barbs which face one another;

a plurality of interior trim strips engaged in the interior channels, each interior trim strip having portions defining two parallel recessed grooves, such that each of the two opposed barbs of an interior channel extend into one of the recessed grooves;

a plurality of exterior trim strips engaged in the exterior channels, each exterior trim strip having portions defining two parallel recessed grooves, such that each of the two opposed barbs of an exterior channel extend into one of the recessed grooves; and a thermopane window assembly positioned between the interior trim strips and the exterior trim strips, wherein the thermopane window assembly is spaced from the inner sash members.

21. The window sash of claim 20 wherein mastic is positioned between the interior trim strips and the thermopane window assembly, and between the exterior trim strips and the thermopane window assembly.

22. The window sash of claim 20 wherein a first exterior trim strip is spaced parallel to a second exterior trim strip across the window assembly, and wherein portions of the exterior trim strips define a plurality of holes, and further comprising:

at least one muntin bar which extends between the first exterior trim strip and the second exterior trim strip, wherein the muntin bar is an extrusion having portions defining a hollow interior channel having ends which open adjacent the first exterior trim strip hole and the second exterior trim strip hole; and a plastic connector which is engaged in each end of the muntin bar in a friction fit, wherein the connector has a tab which protrudes from the muntin bar channel into the hole of an exterior trim strip, the tab being resilient to deform as it is pressed into the hole, and to thereby engage in a snap fit with the hole against removal perpendicular to the thermopane window assembly.

* * * * *

UNITED STATES PATENT AND TRADEMARK OFFICE
CERTIFICATE OF CORRECTION

PATENT NO. : 5,836,119
DATED : November 17, 1998
INVENTOR(S) : Brian A. Emanuel

It is certified that error appears in the above-identified patent and that said Letters Patent is hereby corrected as shown below:

<u>Title page,</u>
The inventors name should be -- Brian A. Emanuel --.
<u>Column 7,</u>
Lines 33 and 34, "surface 136" should be -- sash 96. The --.

Signed and Sealed this

Twenty-eighth Day of May, 2002

Attest:

*Attesting Officer*

JAMES E. ROGAN
*Director of the United States Patent and Trademark Office*